United States Patent [19]

Raterman

[11] Patent Number: 5,198,397
[45] Date of Patent: Mar. 30, 1993

[54] TWO-STAGE FLUID BED REGENERATION OF CATALYST WITH SHARED DILUTE PHASE

[75] Inventor: Michael F. Raterman, Doylestown, Pa.

[73] Assignee: Mobil Oil Corporation, Fairfax, Va.

[21] Appl. No.: 797,678

[22] Filed: Nov. 25, 1991

[51] Int. Cl.$^5$ .................. C10G 11/05; C10G 11/04; B01J 38/36; B01J 20/20

[52] U.S. Cl. .................. 502/43; 208/113; 208/120; 208/161; 208/163; 208/164; 422/144; 502/42

[58] Field of Search ............... 502/40–43; 208/163, 164, 161, 113, 120

[56] References Cited

U.S. PATENT DOCUMENTS

| | | | |
|---|---|---|---|
| 2,401,739 | 6/1946 | Johnson | 502/43 |
| 2,584,391 | 2/1952 | Leffer | 23/288 |
| 2,700,641 | 1/1955 | Rehbein | 208/163 |
| 2,862,786 | 12/1958 | Trainer | 502/41 |
| 4,820,404 | 4/1989 | Owen | 208/159 |
| 4,822,761 | 4/1989 | Walters et al. | 502/43 |
| 4,980,048 | 12/1990 | Leib et al. | 208/113 |

Primary Examiner—Paul E. Konopka
Attorney, Agent, or Firm—Alexander J. McKillop; Malcolm D. Keen; Richard D. Stone

[57] ABSTRACT

A process and apparatus for multi-stage fluidized bed regeneration of spent FCC catalyst in a single vessel. At least two isolated relatively dense phase fluidized beds are disposed beneath a common dilute phase region. Spent catalyst discharged into a primary regeneration stage is regenerated to produce flue gas and partially regenerated catalyst, which preferably overflows into the second stage. Flue gas and entrained catalyst from each fluidized bed are processed in two trains of separation means, preferably cyclones. The inlets of each train are disposed above the isolated fluidized beds, and are effectively separated although sharing an open dilute phase region.

16 Claims, 3 Drawing Sheets

TWO-STAGE FLUID BED REGENERATION OF CATALYST WITH SHARED DILUTE PHASE

BACKGROUND OF THE INVENTION

1. FIELD OF THE INVENTION

The invention relates to a process and apparatus for the regeneration of fluidized catalytic cracking catalyst.

2. DESCRIPTION OF RELATED ART

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425° C.-600° C., usually 460° C.-560° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500° C.-900° C., usually 600° C.-750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking has undergone progressive development since the 40s. The trend of development of the fluid catalytic cracking (FCC) process has been to all riser cracking and use of zeolite catalysts. A good overview of the importance of the FCC process, and its continuous advancement, is reported in Fluid Catalytic Cracking Report, Amos A. Avidan, Michael Edwards and Hartley Owen, as reported in the Jan. 8, 1990 edition of the Oil & Gas Journal.

Modern catalytic cracking units use active zeolite catalyst to crack the heavy hydrocarbon feed to lighter, more valuable products. Instead of dense bed cracking, with a hydrocarbon residence time of 20-60 seconds, much less contact time is needed. The desired conversion of feed can now be achieved in much less time, and more selectively, in a dilute phase, riser reactor. The benefits of riser reactor FCC units are such that many older units have been revamped to take advantage of this advance in technology.

There have been many improvements in the design of FCC regenerators. The considerable evolution in the design of FCC units is reported to a limited extent in the Jan. 8, 1990 Oil & Gas Journal article.

Most new regenerators are of the high efficiency design, i.e., the spent catalyst, preferably with recycled regenerated catalyst, is charged to a fast fluidized bed coke combustor, and from their to a dilute phase transport riser. Coke is efficiently burned in the robustly fluidized coke combustor, while CO afterburning is promoted by the dilute phase conditions in the transport riser. Such regenerators are now the standard for new construction, and are shown in U.S. Pat. No. 4,820,404, Owen, U.S. Pat. No. 4,353,812, Lomas et al, and many others. These two patents are incorporated herein by reference.

Such modern regenerator designs, sometimes called a high efficiency regenerator, are preferred for all new construction. For the many FCC units built with low efficiency, i.e., bubbling dense bed regenerators, it has not been possible and/or economically justifiable to improve the efficiency of the bubbling bed regenerator.

Such bubbling bed regenerators are inherently inefficient because of the presence of large gas bubbles, poor catalyst circulation, and the stagnant regions. The bubbling bed regenerators usually have two to three times the catalyst inventory of more modern regenerators. The increased inventory, and longer catalyst residence time, make up for a lack of efficiency.

For such units, characterized by a single, bubbling dense bed regenerator, there has been no good way to achieve the benefits of high efficiency regeneration. Site constraints usually make replacement of a single bubbling bed regenerator with a high efficiency regenerator.

Site constraints also usually make modifications, such as those that would permit several stages of regeneration to be achieved in a single vessel, prohibitively expensive. Part of the difficulty is that usually some form of baffling or separation is needed to achieve multistage regeneration, i.e., the fluidized bed regions must be isolated, and the flue gas from each region must be isolated. Some means of recovering catalyst from flue gas is usually essential, because even in bubbling bed regenerators with relatively low superficial vapor velocities there is a tremendous amount of catalyst entrainment into the dilute phase. Multiple cyclones in parallel, with multiple stages of cyclones, i.e., in series, are usually needed to recover catalyst from flue gas. These cyclones are heavy, and difficult to support, and when multiple stages of catalyst regeneration are involved, and great swings in temperature must be accommodated in the regenerator, the problems of cyclone support, and thermal stress, multiply.

It was easy to isolate the fluidized bed regions—the catalyst acted like a liquid, and a simple solid baffle would effectively one fluidized region of catalyst from the other. Baffled regions, defining isolated fluidized beds sharing a common vapor region above, are common. U.S. Pat. No. 2,584,391 disclosed an apparatus with a baffled fluidized bed region which could be said to define multiple regions in a fluidized bed, but the vapor phases from each fluidized bed were mixed together and withdrawn from a single outlet. This was an improvement, it gave the option to achieve multiple stage regeneration, but added the constraint that the flue gas streams had to be compatible. If an attempt were made to operate the apparatus shown in U.S. Pat. No. 2,584,931 as a regenerator, with the inner stage in partial CO combustion mode, and the outer stage in complete CO burn mode, with an oxidizing atmosphere, the two flue gases would "afterburn" when mixed together in the dilute phase region above the dense beds. The lack of sufficient spent catalyst, to absorb the heat of combustion, would lead to extremely high temperatures in the flue gas line and in the cyclones, which could damage the unit.

Something better was needed, that would allow the beds to be isolated (this was easy) while keeping the flue gasses from the beds isolated (this was difficult).

I realized that some of the vices of these older regenerators were also virtues, and that two isolated fluidized beds could be accommodated in a single regenerator vessel. The large size of these vessels, large enough to hold 100's of tons of fluidized catalyst, and the relatively low gas velocities which were used to minimize entrainment catalyst entrainment with the flue gas, provided an ideal way to solve the problem. I discovered a way to effectively isolate the flue gas from each stage of regeneration, relying on laminar flow and the laws of physics to isolate the flue gas streams, rather than physical barriers. In a preferred embodiment I use a somewhat high superficial vapor velocity in one region to entrain additional catalyst into the dilute phase, and act as insurance or buffer, to minimize high temperature excursions when oxidizing and reducing flue gasses meet. In another embodiment I use unusually low superficial vapor velocities, and an unusual way of transferring catalyst from one region to another, to reduce pressure drop through the system and maximize coke burning capacity of the regenerator.

BRIEF SUMMARY OF THE INVENTION

Accordingly, the present invention provides a process for the multi-stage, fluidized bed regeneration of coke containing fluidized catalytic cracking catalyst in a regenerator vessel having an upper portion and a lower portion, and containing at least one vertical baffle means within said lower portion adapted to separate said lower portion into at least two isolated fluidized beds beneath a shared dilute phase region, said shared dilute phase region being in said upper portion of said regenerator vessel comprising: conducting a primary stage of catalyst regeneration by discharging said coke containing catalyst into a primary regeneration stage comprising one of said isolated fluidized beds and having a coked catalyst inlet means, an oxygen containing gas inlet means in a lower portion of said isolated fluidized bed, and operating at catalyst regeneration conditions to produce partially regenerated catalyst which is discharged from said primary regeneration stage via a partially regenerated catalyst transfer means, and a primary flue gas stream comprising entrained, partially regenerated catalyst and fines which is discharged up into said shared dilute phase region above said primary regeneration stage; conducting at least a secondary stage of catalyst regeneration by discharging said partially regenerated catalyst from said partially regenerated catalyst transfer means into a secondary regeneration stage comprising at least one other of said isolated fluidized beds and operating at catalyst regeneration conditions and having a partially regenerated catalyst inlet connective with said catalyst transfer means of said primary stage, an oxygen containing gas inlet means in a lower portion of said isolated fluidized bed in said secondary regeneration stage, and a regenerated catalyst outlet means to produce regenerated catalyst which is withdrawn via said regenerated catalyst outlet means and a secondary flue gas stream comprising regenerated catalyst and fines which is discharged up into said shared dilute phase region above said secondary regeneration stage; separating said primary flue gas stream in a primary catalyst and flue gas separation means having an inlet for primary flue gas and entrained partially regenerated catalyst, an outlet for recovered partially regenerated catalyst, and an outlet for flue gas having a reduced catalyst content and adapted to remove said primary flue gas from said regenerator vessel as a primary flue gas stream with a reduced catalyst content, and wherein said inlet of said primary catalyst/flue gas separation means is connective with said shared dilute phase region above said primary regeneration zone; and separating said secondary flue gas stream in a secondary flue gas and catalyst separation means having an inlet for secondary flue gas and entrained regenerated catalyst, an outlet for recovered regenerated catalyst, an outlet for secondary flue gas having a reduced catalyst content and adapted to remove said secondary flue gas from said regenerator vessel as a secondary flue gas stream with a reduced catalyst content, and wherein said inlet of said secondary catalyst/flue gas separation means is connective with said shared dilute phase region above said secondary regeneration zone; removing regenerated catalyst from said secondary regeneration stage as a product of said regeneration process; and removing from said regenerator vessel said primary and said secondary flue gas streams as isolated streams.

In another embodiment the present invention provides a process for the multi-stage, fluidized bed regeneration of spent, coke containing fluidized catalytic cracking catalyst comprising: partially regenerating said spent catalyst in a primary regeneration stage by discharging said coked catalyst into a primary regeneration stage within a regenerator vessel, said primary regeneration stage operating at catalyst regeneration conditions and comprising an open topped cylinder disposed in a lower portion of said regenerator vessel and having a coked catalyst inlet, an oxygen containing gas inlet in a lower portion of said open cylinder, and partially regenerating said spent catalyst in said primary regeneration zone by contact with an oxygen containing gas to produce partially regenerated catalyst and a primary flue gas stream comprising gaseous products of combustion and entrained partially regenerated catalyst; overflowing partially regenerated catalyst from said cylinder into a secondary regeneration zone comprising an annular bed of catalyst around said open cylinder; discharging said primary flue gas stream up from said open cylinder into a dilute phase region within said regenerator vessel above said open cylinder and above said annular bed; processing said primary flue gas stream in at least one primary regeneration stage cyclone having an inlet connective with the dilute phase region above said open cylinder and separating same into a primary flue gas stream with a reduced content of partially regenerated catalyst which is withdrawn from said regenerator vessel and a recovered catalyst stream which is returned to a dense phase fluidized bed; collecting said partially regenerated catalyst from said primary regeneration stage in said annular bed and regenerating same by contact with an oxygen containing regeneration gas at catalyst regeneration conditions to produce regenerated catalyst which is withdrawn as a product from said regenerator vessel and a secondary regeneration stage flue gas comprising entrained regenerated catalyst and gaseous products of combustion; and processing said secondary regeneration stage flue gas stream in at least one secondary regeneration stage cyclone having an inlet connective with the dilute phase region above said annular bed and separating same into a secondary flue gas stream with a reduced content of regenerated catalyst which is withdrawn from said regenerator vessel and a recovered regenerated catalyst stream which is returned to a dense phase fluidized bed.

In an apparatus embodiment, the present invention provides an apparatus for the multi-stage, fluidized bed regeneration of coke containing fluidized catalytic cracking catalyst comprising: a regenerator vessel having an open upper portion and a baffled lower portion, said lower portion containing at least one vertical baffle means adapted to separate said lower portion into at least two isolated fluidized beds, a primary stage bed and a secondary stage bed, and wherein both of said isolated fluidized beds are beneath said open upper portion of said vessel; a coked catalyst transfer line having an inlet connective with a source of coked catalyst and an outlet connective with a primary catalyst regeneration stage; a primary regeneration stage comprising said primary stage bed and adapted to receive coked catalyst from said coked catalyst transfer means, having an oxygen containing gas inlet means in a lower portion of said primary stage bed, and wherein said primary regeneration stage produces partially regenerated catalyst and a primary regeneration stage flue gas which is discharged up into said shared dilute phase region above said primary regeneration stage; a secondary regeneration stage comprising said secondary stage bed and adapted to receive partially regenerated catalyst from said primary regeneration stage, having an oxygen containing gas inlet means in a lower portion of said isolated fluidized bed in said secondary regeneration stage, and a regenerated catalyst outlet means; a primary regeneration stage catalyst and flue gas separation means having an inlet for primary flue gas and entrained partially regenerated catalyst, an outlet for recovered partially regenerated catalyst connective with at least one isolated fluidized bed, and an outlet conduit passing through said regenerator vessel for removal of flue gas having a reduced catalyst content and wherein said inlet is above or connective with said shared dilute phase region above said primary regeneration zone; and a secondary regeneration stage catalyst and flue gas separation means having an inlet for secondary flue gas and entrained regenerated catalyst, an outlet for recovered regenerated catalyst connective with at least one isolated fluidized bed, and an outlet conduit passing through said regenerator vessel for removal of secondary flue gas having a reduced catalyst content and wherein said inlet of said secondary catalyst/flue gas separation means is above or connective with said shared dilute phase region above said secondary regeneration zone; and a regenerated catalyst removal means connective with said secondary regeneration stage.

In preferred embodiments, the invention also provides a process and apparatus for achieving multi stage regeneration, and transporting catalyst from a turbulent or fast fluidized bed region into another fluidized bed by lateral discharge of catalyst from one fluidized bed region to another, rather than relying on overflow, or entrainment for most catalyst transfer.

DESCRIPTION OF PREFERRED EMBODIMENTS

In all bubbling dense regenerators commonly used the spent catalyst is added to the bubbling dense bed, and regenerated catalyst is withdrawn from the same dense bed. There is only a single flue gas, and a single dilute phase over the bubbling dense bed. There are other designs, not shown, which have baffles dividing the bubbling dense bed region into two or more bubbling dense bed regions, under a common vapor space.

Figure 1:
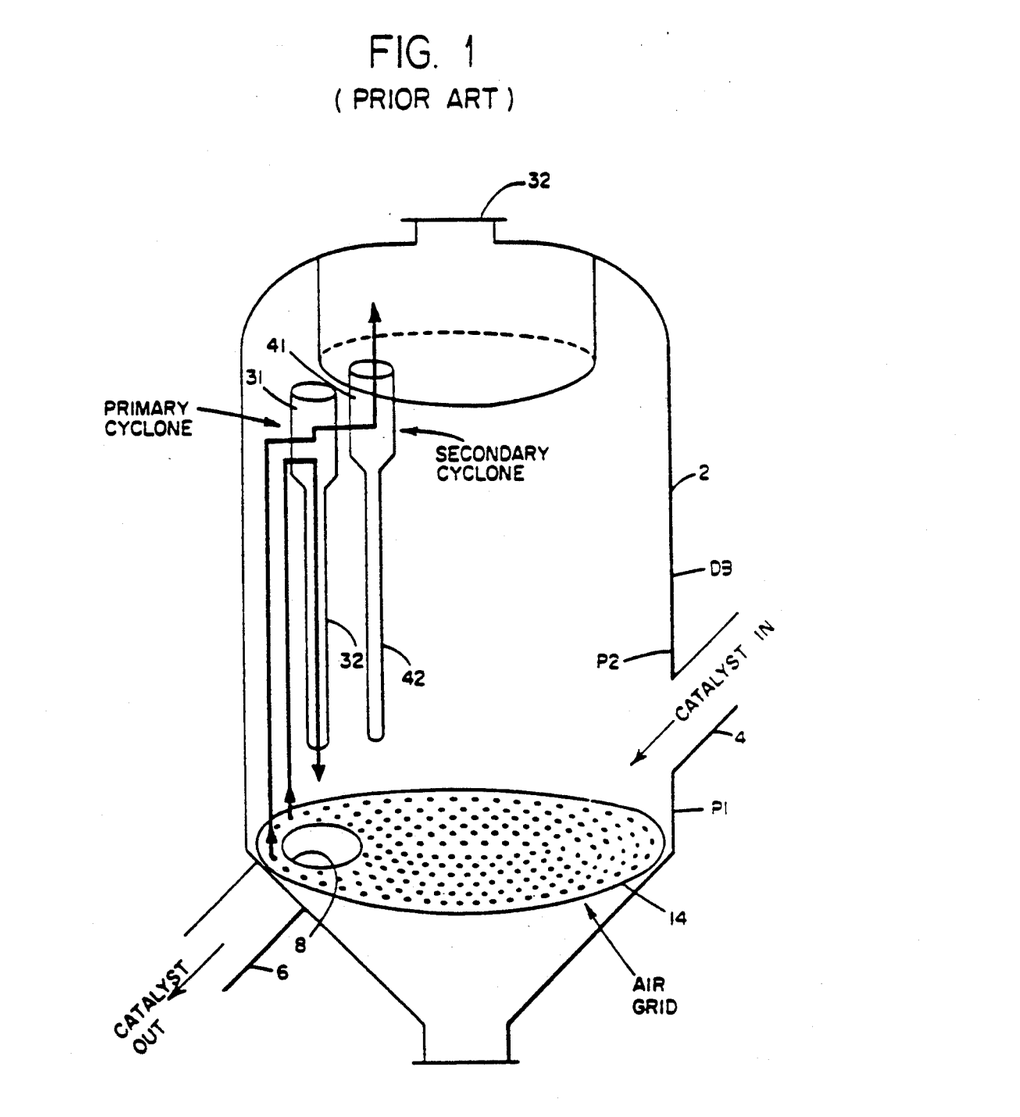
FIG. 1 (prior art) is a schematic view of a conventional FCC regenerator, taken from FIG. 1 of U.S. Pat. No. 4,980,048.

FIG. 1 (prior art) is a simplified schematic view of a cross flow FCC regenerator of the prior art, as shown in U.S. Pat. No. 4,980,048, Sapre et al, which is incorporated by reference.

This design, especially as modified in the '048 patent, is a good bubbling dense bed regenerator, although there are other types such as the cross-flow regenerator shown in U.S. Pat. No. 4,994,424, Sapre et al, which is incorporated by reference. Another good dense bed regenerator design is used in the Kellogg Ultra Orthoflow converter Model F shown as FIG. 17 of Fluid Catalytic Cracking Report, in the Jan. 8, 1990 edition of Oil & Gas Journal. The invention is not limited to any one type of regenerator, and may be beneficially used in any existing bubbling bed regenerator, or used in a new, grass-roots unit.

Referring now to FIG. 1, spent catalyst in line 4 passes down into regenerator 4. Air passes up into the regenerator via air grid 14, and fluidizes and regenerates the catalyst, which is maintained as a bubbling fluidized dense phase bed.

Catalyst flows across the regenerator, and is removed via sink 8 in the base of the air grid 14, which is therefore on the bottom of the bubbling fluidized bed of catalyst.

Flue gas and entrained catalyst rise above the bubbling bed, pass through primary cyclone 31 and secondary cyclone 41. Catalyst is recycled to the dense bed via diplegs 32 and 42, while flue gas is discharged via outlet 32.

Regenerated catalyst withdrawn from the regenerator via line 6 is passed to a riser reactor, not shown, where it contacts and cracks a fresh hydrocarbon feed to produce cracked products and spent catalyst. These are separated, and the spent catalyst stripped with steam in a catalyst stripper, not shown, to produce stripped catalyst which is charged via line 4 to the regenerator.

These conventional regenerators are extremely large. A review of some typical units provides an idea of the immense size of these units.

The approximate dimensions of a typical cross flow regenerator, associated with a typical 20,000 BPD cracking unit are as follows. The overall ID of the regenerator vessel is about 16 feet. The catalyst flow is 1200 tons/hr into the regenerator. The catalyst is added via one tangential inlet pipe having an ID of 18 inches. The catalyst velocity as it leaves the inlet is about 5 feet per second. It is discharged at an angle (40 degrees) as shown in FIG. 1 into a dense phase fluidized bed of catalyst having a depth of about 12 to 20 feet. The catalyst sink, or bathtub, has an ID of about 5 feet for withdrawal of catalyst. The sink is at the opposite side of the regenerator from the catalyst inlet.

Many cross-flow regenerators are somewhat larger than this. The regenerator associated with a 50–60,000 BPD unit will have a catalyst inventory of around 200 tons and will be much larger than the smaller unit described above. The diameter will be about 30 to 36 feet, and the catalyst inlet line ID about 3 feet. Catalyst flow into the regenerator will be 3600 tons per hour. The dense bed of catalyst has a depth of 10–15 feet. The bathtub will have an ID of about 7 or 8 feet.

The superficial vapor velocities in such regenerators are typically low, in large part to minimize catalyst entrainment. Although there is considerable variation between units, and some variation because of pressure and geometry of the regenerator, in most the superficial vapor velocity will be from 0.1 to at most 2 or perhaps 4.5 feet per second. In many bubbling dense bed regenerators the superficial vapor velocity will range from 0.15 to 4.5 feet per second, with a majority operating near 2 to 3.5 feet per second.

These are large vessels, and the vapor velocities are fairly low. I believe the flow in such vessels is laminar, save perhaps for some turbulence where major streams are introduced or removed. These large vessels, and sluggish flows, provided a way to allow segregated fluidized bed to share a common vapor space, and to isolate flue gas from these segregated beds by relying on fluid flow rather than partitions. This can be seen more clearly by reviewing FIG. 2

Figure 2:
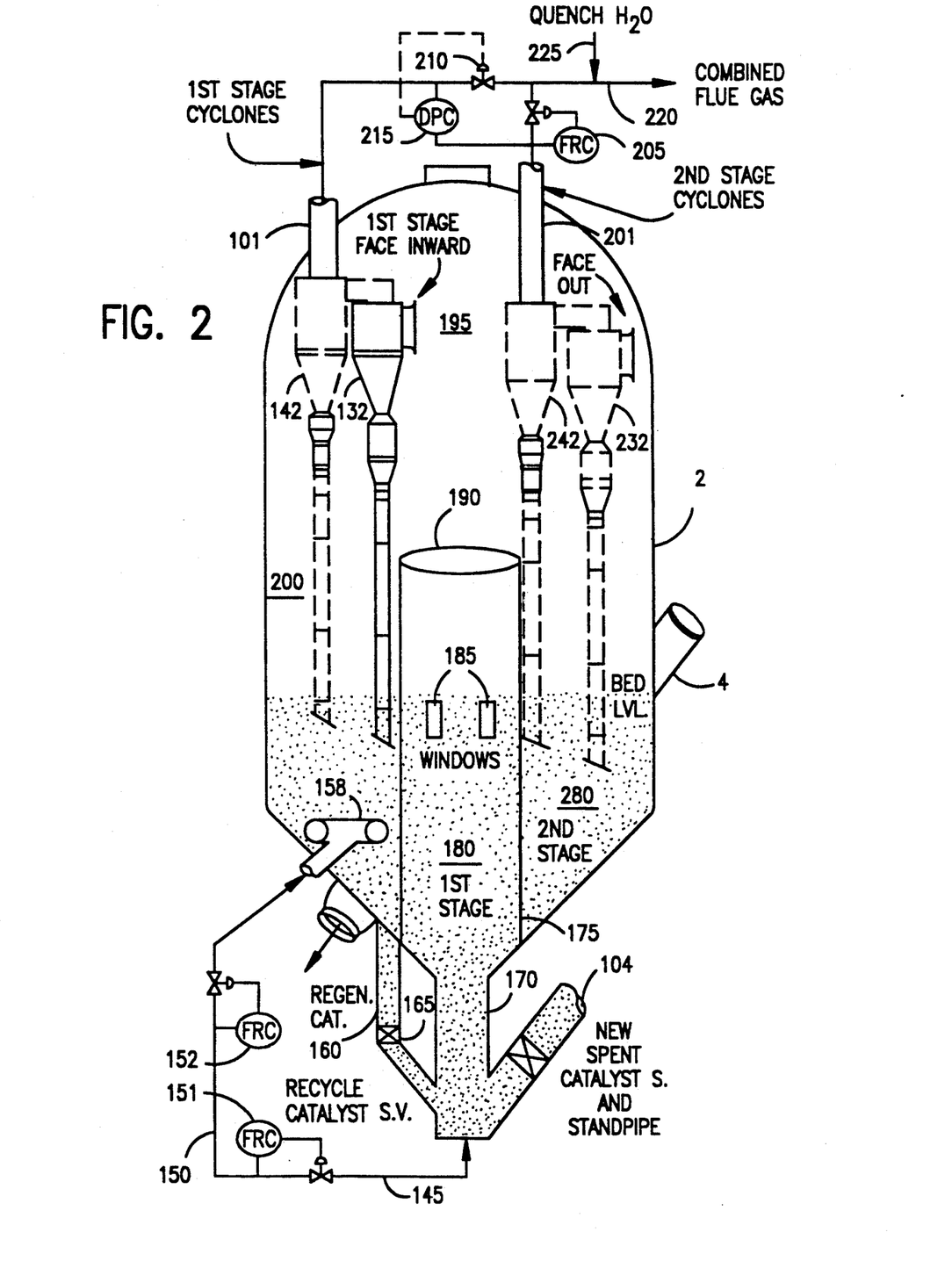
FIG. 2 (invention) is a schematic view of a regenerator of the invention.

In FIG. 2 (invention) only the regenerator is shown. Like elements in FIG. 1 and 2 have like numerals FIG. 2 shows how it is possible to isolate two dilute phase regions above two fluidized beds, without physically isolating the dilute phase regions.

A preferred embodiment is shown in FIG. 2, involving a new catalyst inlet, 104 connective with the base of riser mixer section 170 and catalyst recycle line 160. It is preferred to mix spent catalyst from line 104 with hot regenerated catalyst from line 160, and combustion air added via line 145 and using flow recorder controller 151 to monitor and control air addition rate. Mixing hot regenerated catalyst with spent heats the spent catalyst sufficiently so that it "lights off" in the transport riser to some extent and to a great extent in the primary combustion stage 180.

The primary combustion stage can operate under any fluidized regime short of dilute phase transport flow. It may operate as an expanded bed, bubbling dense bed, turbulent fluidized bed or even as a fast fluidized bed. Preferably the air admission rate, and the cross-sectional area available for flow, and catalyst addition and catalyst recycle, if any, are adjusted to maintain much or all of the bed in region 180 in at least a turbulent fluidized condition, and preferably in a turbulent or "fast fluidized condition", characterized by intense agitation, relatively small or no bubbles, and rapid coke combustion. In terms of superficial vapor velocity and typical FCC catalyst sizes, this means the vapor velocity should exceed 0.5 feet per second, preferably is 2–15 feet per second, and most preferably is 3–8 feet per second. The catalyst density in a majority of the volume in the coke combustor will be less than 35 pounds/cubic foot, and preferably is less than 30 pounds/cubic foot, and ideally between 8 and about 25 pounds/cubic foot.

The densities and superficial vapor velocities discussed herein presume that the unit operates at a pressure where the vast majority of FCC units operate, namely 15–40 psig. A few might operate at slightly lower pressures, and a significant minority may operate at somewhat higher pressures, primarily those with power recovery systems. In general, changes in pressure do not significantly change the superficial vapor velocity needed to maintain, e.g., a fast fluidized bed or a bubbling dense bed. It is easy to calculate the superficial vapor velocity needed to support a given type of fluidization, and the bed density expected at those conditions. In general, an increase in pressure will decrease the superficial vapor velocity needed to achieve a fast fluidized bed, but increase the mass of gas required to maintain a turbulent fluidized bed.

The partially regenerated catalyst, and flue gas may be discharged from region 180 in several ways, depending on local conditions. In one embodiment, all or preferably a majority, most preferably over 90%, of the catalyst is discharged upwardly in a relatively dense bed, or in a somewhat dilute phase condition, up through opening 190. There will be a significant amount of entrainment of catalyst with flue gas, but most of the discharged catalyst will simply overflow, or "fountain" to a limited extent, and fall down into second stage combustion region 280.

This embodiment, especially when fast fluid bed conditions are maintained in region 180, will provide a vigorous stage of catalyst regeneration. The air blower, or other air supply means, will also be called on to do a fair amount of work, forcing air up from the base of the riser mixer 170 through a considerably depth of catalyst to the outlet region 190. When bubbling fluidized bed conditions are maintained in region 180, there will be a considerable pressure drop to overcome for air to get through the system. Phrased another way, the air blower will not only supply combustion air, it will also be called on to do a lot of work in elevating all of the catalyst flow (which will usually be on the order of 10 to 50 tons of catalyst per minute) from the base of the riser mixer to the very top of region 185, i.e., outlet 190, only to have the catalyst fall down to the much lower bed region 280. Much unnecessary work can be avoided by providing the catalyst with another way to leave the first stage region 180.

Windows 185 are shown which permit much or essentially all of the catalyst to pass from the first combustion stage to the second, region 280, without passing over outlet 190. There will still be considerably entrainment of catalyst in flue gas exiting region 190, but the bulk of the catalyst can simply flow from region 180 through windows 185 into the second fluidized bed 280. Changing the inventory of catalyst in the regenerator, and/or changing the superficial vapor velocity in the primary regeneration stage, can shift the amount of catalyst which overflows the first combustion stage via outlet 190 and the amount which flows laterally via windows 185. In this way the refinery has a great deal of control on the amount of entrainment of catalyst in flue gas from the primary regeneration stage, and some control on the pressure of air needed to supply combustion air for the first regeneration stage.

Catalyst in the second stage, regardless of whether added by overflow via outlet 190 or relatively dense phase lateral flow via windows 185, can be, and preferably is, subjected to an additional stage of regeneration in region 280. Additional combustion air may be added via air line 150 and flow recorder controller 152, and distributed via one or more air rings indicated as 158, into region 280. Even if no additional regeneration is needed, it will usually be essential to have a certain amount of fluffing air, sufficient to maintain fluidization.

Catalyst is preferably recycled from the second regeneration stage to the inlet to, or directly into, the first stage of regeneration. In the embodiment shown hot regenerated catalyst is removed via line 160, with the amount controlled by slide valve 165, and passed into the base of region 170. Although this is preferred it is not essential. Elimination of catalyst recycle will frequently limit the amount of carbon burning achievable in the first stage, so some catalyst recycle will usually be practiced.

The flue gas from both the first stage region and the second stage region will contain large amounts of catalyst. The regenerator uses conventional flue gas/catalyst separation means, such as cyclone, disposed in an unconventional way, to effectively isolate both flue gas streams.

Multiple cyclones are of course needed to deal with the extremely large flows involved in an FCC regenerator. Several stages of cyclone separation are needed, and additional stages, e.g., tertiary cyclones, or porous stainless steel filters may be needed to meet local regulations on particulates in flue gas. This is conventional. What is unconventional is arranging the cyclones (or other catalyst/flue gas separation means) so that the flue gas from the first stage is isolated from the flue gas from the second stage. Rather than rely on mechanical partitions, I rely on laminar flow and the laws of physics to keep these gas streams isolated, despite sharing a common dilute phase region above the two distinct fluidized beds.

Two sets of cyclones are provided, one set associated with each stage of regeneration.

The primary cyclones associated with the first regenerator stage (typically 4-6 in parallel) are radially disposed about the outlet of the primary combustion stage. The secondary cyclones associated with the first regenerator stage (typically 4-6 in parallel) are arranged in series with the primary cyclones. This use of multiple cyclones in parallel and series arrangements is common in FCC regenerators.

The primary cyclones associated with the second regenerator stage (typically 4-6 in parallel) will also be radially disposed about the outlet of the primary combustion stage, but with an important difference—the horns or inlets will face radially out rather than radially in. Preferably the horns will be near the circumference of the vessel rather than the center. The secondary cyclones (typically as many as the primary) will be in series with the primary cyclones. The radial disposition of the cyclones can be seen more clearly in FIG. 3, which shows a vertical cross-sectional view of the regenerator of the present invention.

Figure 3:
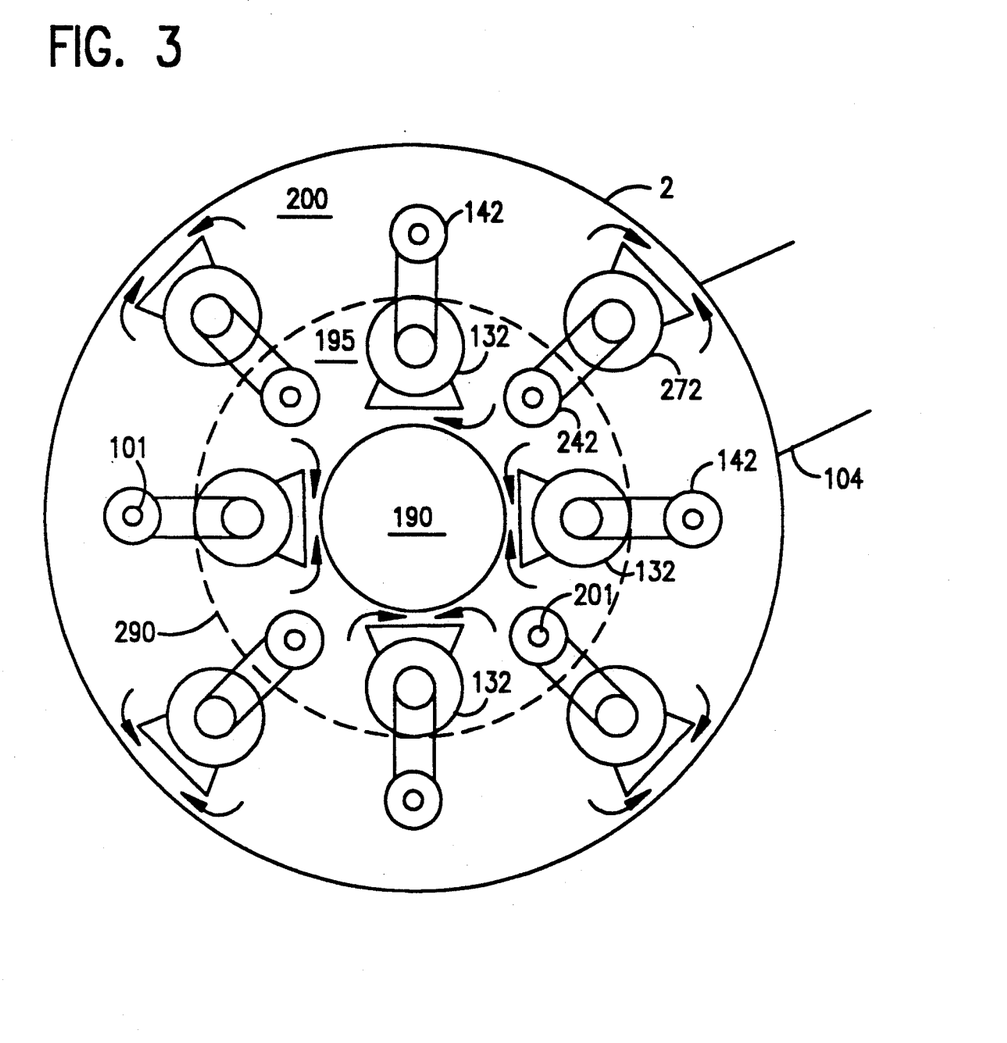
FIG. 3 (invention) is an elevation view of the regenerator shown in FIG. 2, showing the radial distribution of the cyclones.

In FIG. 3, a plurality of radially and symmetrically disposed primary cyclones 132 are provided above, and radially distributed about, primary regeneration stage outlet 190. The horns 135 all face the centralize of the generally vertical primary regeneration stage. The primary cyclones discharge into secondary cyclones 142. Recovered catalyst and some fines are discharged via diplegs into the second stage fluidized bed, which will generally will be a bubbling dense bed.

Flue gas from the second stage fluidized bed passes up into dilute phase region 200. There will always be a significant amount of catalyst entrainment, though usually less because superficial vapor velocities will usually be somewhat less in the second combustion stage. This entrained catalyst is recovered using two stages of cyclones, primary cyclones 232 and secondary cyclones 242. Recovered catalyst is discharged via diplegs into the second fluidized bed, while flue gas is removed via second stage flue gas outlet 201.

The flue gas from the second combustion stage is effectively isolated from the flue gas discharged from the primary combustion stage because the gas flow is laminar, and the cyclone horns are disposed to set up two radial flows. In this case the primary stage flue gas flows radially in to out, i.e., from the center of the vessel above outlet 190 radially out to the horns 133 of cyclones 132. The second stage flue gas, discharged from second fluidized bed 280, flows radially out to in. There will be some mixing, but proper selection of the number and size of the horns will effectively isolate flue gas from the first combustion stage from flue gas from the second combustion stage. A dotted line 290 indicates the rough limits of a "virtual partition" which has been created in the dilute phase region of vessel 2 by the placement of the cyclone inlet horns.

One of the significant benefits of coke combustion in two stages, as shown in the figures, is that the second stage region, bed 280 and to a somewhat lesser extent the dilute phase region 200 is a much drier atmosphere than dilute phase region 195 or fluidized bed zone 190 where the primary or first stage of coke combustion occurs. There is a lower steam partial pressure in the second fluidized bed because the water of combustion, and entrained stripping steam, are removed with the flue gas from the first stage of combustion. The entrained steam and the hydrogen rich fast coke are more than 90% removed in the first stage of regeneration, so the second stage is much drier.

Other configurations are possible. The horns 133 of the cyclones 132 may all be tied together, i.e., the inlet for the cyclones may be connected to a single inlet which is vertically displaced from, and axially aligned with, the first combustion stage. Preferred configurations of this type are shown in U.S. Pat. Nos. 4,843,051 and 5,006,945 Pappal et al and U.S. Pat. No. 5,009,853 Kovacs et al which are incorporated by reference.

Depending on the amount of catalyst entrainment desired into the cyclones the horns, or a central radial distributor connected to the cyclone horns, may be closer to or further from the outlet 190. Large amounts of entrainment are usually undesirable, but if afterburning in the dilute phase region is a problem, putting the cyclone inlets nearer outlet 190 will greatly increase catalyst entrainment. Because of the different rates of thermal expansion, and large temperature swings experienced by commercial FCC regenerators, it will usually not be necessary or desirable to have any physical connection between the cyclones and the first regeneration stage.

The flow scheme shown in the Figures may also be reversed, i.e., addition of spent catalyst to the outside will allow the primary or first stage of catalyst regeneration to be conducted in the annular region of the regenerator, with regeneration completed in a centrally located second stage. Catalyst can flow through windows 185 into the central region, or overflow the annular region and pour into the central region.

Although this reverse flow arrangement is possible, it is not preferred. It usually will be easier to efficiently burn coke in a vigorously fluidized central region, and complete regeneration in the outer annular region, as shown in FIGS. 2 and 3. It will also be possible to use a side-by-side arrangement, with a horizontal baffle extending across the regenerator vessel in the dense bed or fluidized bed region, and the horns of the cyclones located on, or having inlets facing, opposing sides of the regenerator.

When multiple stages of catalyst regeneration are practiced, preferably from 20 to 90% of the coke combustion occurs in the first stage, with the remainder in the second stage.

In many units the optimum amount of coke combustion that occurs in each zone will depend on quite a few factors, the amount of sulfur and nitrogen in the feed, rate of catalyst replacement, metals contamination in the feed, etc. For cleanest catalyst, when metals and NOx emissions are not a problem, it is beneficial to front load the air addition, i.e., to maximize coke combustion in the first stage, and maintain fast fluidized bed conditions therein. To minimize NOx, coke combustion should be delayed, so that large amounts of carbon will be present to hinder NOx formation.

The first and second regeneration stage flue gas streams may be mixed together, as shown in FIG. 2. Considerable fine tuning of the amount of gas withdrawn from each region is possible by the use of flow recorder controller 205, and differential pressure controller 215 operating in conjunction with flow control valve 210. The flue gas streams may be mixed, as shown, and if this is done it will usually be beneficial to provide water quench injections means 225 connective with combined flue gas stream line 220, so that if afterburning occurs dangerous temperature excursions may be prevented. It is also possible, and may be preferred to keep the two flue gas streams isolated. When one stage of the regenerator, e.g., the first, is run in partial CO burn mode the resulting CO rich flue gas can be sent to a CO boiler. If the second stage is run in complete CO burn mode, to produce cleanly regenerated catalyst, the resulting high temperature, somewhat oxygen rich flue gas, can simply be sent to the refinery flare system.

DESCRIPTION OF PREFERRED EMBODIMENTS

FCC FEED

Any conventional FCC feed can be used. The process of the present invention is especially useful for processing difficult charge stocks, those with high levels of CCR material, exceeding 2, 3, 5 and even 10 wt % CCR.

The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resids, and vacuum resids, and mixtures thereof. The present invention is most useful with feeds having an initial boiling point above about 650° F.

FCC CATALYST

Any commercially available FCC catalyst may be used. The catalyst can be 100% amorphous, but preferably includes some zeolite in a porous refractory matrix such as silica-alumina, clay, or the like. The zeolite is usually 5-40 wt. % of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 Wt % RE.

Relatively high silica zeolite containing catalysts are preferred for use in the present invention. They withstand the high temperatures usually associated with complete combustion of CO to CO2 within the FCC regenerator.

The catalyst inventory may also contain one or more additives, either present as separate additive particles, or mixed in with each particle of the cracking catalyst. Additives can be added to enhance octane (shape selective zeolites, i.e., those having a Constraint Index of 1-12, and typified by ZSM-5, and other materials having a similar crystal structure), adsorb SOX (alumina), remove Ni and V (Mg and Ca oxides).

Additives for removal of SOx are available from several catalyst suppliers, such as Davison's "R" or Katalistiks International, Inc.'s "DeSox."

CO combustion additives are available from most FCC catalyst vendors. Operation with from 0.01 to 100 ppm Pt metal or enough other metal to give the same CO oxidation, may be used with good results. Very good results are obtained with as little as 0.1 to 10 wt. ppm platinum present on the catalyst in the unit.

The FCC catalyst composition, per se, forms no part of the present invention.

CRACKING REACTOR/STRIPPER/REGENERATOR

The FCC reactor, stripper and regenerator shell 4, per se, are conventional, and are available from various licensors, or will already be in existence in many refineries.

The modifications needed to add the modifications shown in FIG. 2 are well within the skill of the art. The cyclones etc are all conventional, what is unconventional is the disposition of the cyclone inlets to partition the dilute phase region.

REGENERATOR PROCESS CONDITIONS

Conditions in the regenerator can be conventional. Preferably at least the first stage is conducted at fast fluidized bed regeneration conditions, with velocities approaching those used in typical H.E.R. regenerators, such as those shown in U.S. Pat. Nos. 4,595,567 (Hedrick), 4,822,761 (Walters, Busch and Zandona) and U.S. Pat. No. 4,820,404 (Owen), which are incorporated herein by reference.

FCC REACTOR CONDITIONS

Conventional cracking conditions may be used. Typical riser cracking reaction conditions include catalyst/oil ratios of 0.5:1 to 15:1 and preferably 3:1 to 8:1, and a catalyst contact time of 0.1 to 50 seconds, and preferably 0.5 to 5 seconds, and most preferably about 0.75 to 2 seconds, and riser top temperatures of 900° to about 1050° F.

BENEFITS OF STAGED COMBUSTION

The process of the present invention achieves several important objectives in the shell of an existing regenerator. Among the objectives are increased coke burning capacity, reduced NOx emissions, and reduced catalyst deactivation. Each will be briefly reviewed.

Increased coke burning capacity can be achieved in several ways. When, e.g., the central region is operated at fast fluidized bed conditions more coke can be burned because each square foot of the old bubbling bed regenerator can be used as productively as before, while the central region, run as an FFB, burns two to three times as much coke per square foot of cross sectional area as compared to a bubbling bed regenerator. Partial CO combustion, leaving a significant amount of CO in the flue gas from the first or the second stage, or both, allows a given volume of air to burn more coke. Operating the first stage in partial CO burn mode, and the second stage in full CO burn mode, can produce unusually clean, or low coke containing, catalyst, while shifting some of the oxygen requirement and consequent heat generation to units downstream of the FCC regenerator.

Reduced NOx emissions can be achieved if most of nitrogen compounds are burned under relatively mild, perhaps even partially reducing conditions in the first regeneration stage. The presence of carbon during first stage regeneration tends to suppress formation of NOx, so that large amounts of coke combustion can be achieved without inordinate amounts of NOx being formed. Partial CO combustion mode in the first stage will greatly reduce or eliminate NOx emissions from the first stage.

Improved catalyst stability is obtained by steaming the catalyst less. More than 90% of the "fast coke" or hydrogen rich coke will usually be removed in the first regeneration stage. The complete regeneration of the catalyst, and removal of the "hard coke", and the highest temperatures, and the most oxidizing conditions, can be left to the second regeneration stage. This staged combustion allows most of the water of combustion to be formed and rapidly removed, in the flue gas from the first regeneration stage, allowing drier regeneration of catalyst in the downstream regions, e.g., the bubbling dense bed. The hydrogen rich coke is largely eliminated in the first stage, so there will be significantly less water of combustion formed in the bubbling dense bed. There will still be some catalyst deactivation, thermal deactivation in the second stage and some hydrothermal catalyst deactivation in the first stage, but not too much because of the reduced residence time in the first stage and somewhat lower temperature.

ILLUSTRATIVE EMBODIMENT

Two conventional regeneration processes of the prior art, a single dense bed regenerator, and a conventional high efficiency regenerator were compared against a multi-stage regeneration process of the invention. The comparisons being made for units processing a resid feed to the same reactor severity level. The regenerators are being operated to burn coke off of the catalyst to the same level on regenerated catalyst.

I. Single Dense Bed Regenerator (Prior Art)

This case illustrates the problem. Many refineries have these regenerators, and they are plagued with the need for excessive catalyst inventories, and consequently excessive catalyst steaming.

| CASE I CONVENTIONAL | |
|---|---|
| Catalyst Circulation | 3134777 lbs/hr |
| Regenerator Dense Phase Temp | 1305° F. |
| Regenerator Dilute Phase Temp | 1355° F. |
| Air Rate | 153 MSCFM |
| Regenerator Superficial Velocity | 4.9 ft/see |
| Catalyst Inventory | 198925 lbs |
| Catalyst Cooler Duty | 245.9 MM BTU/HR |
| Carbon On Regenerated Catalyst | 0.08 wt % |
| Flue Gas Comp. (Dry) | |
| CO | 0.02 mol % |
| CO$_2$ | 16.07 |
| N$_2$ | 82.14 |
| O$_2$ | 1.77 |

II. High Efficiency Regenerator (Prior Art)

Catalyst regeneration in a modern high efficiency regenerator is a significant improvement over bubbling dense bed regeneration (Case I). Catalyst inventories are typically reduced 30–60% for the same cracking capacity, as compared to bubbling dense bed regenerators. Although such regenerators are preferred, it usually costs too much to simply replace an existing bubbling dense bed regenerator with a high efficiency regenerator. Case II thus represents something that is preferred but not obtainable in refineries with older type regenerators.

| CASE II HIGH EFFICIENCY | |
|---|---|
| Catalyst Circulation | 3134777 lbs/hr |
| Regenerator Dense Bed Temp | 1311.6° F. |
| Regenerator Top Temp | 1320.4° F. |
| Air Rate | 153 MSCFM |
| Regenerator Superficial Velocity | 4.9 ft/sec |
| Catalyst Inventory | 143685 lbs |
| Catalyst Cooler Duty | 243.6 MM BTU/HR |
| Carbon on Regenerated Catalyst | 0.05 wt % |
| Flue Gas Comp (Dry) | |
| CO | 0.05 vol % |
| CO$_2$ | 16.10 |
| N$_2$ | 82.13 |
| O$_2$ | 1.71 |

III Multi-Stage Regenerator (Invention)

This case involves computer simulation of a preferred regenerator of the invention, with a relatively fast fluidized bed primary stage of regeneration, and a bubbling dense bed second stage of regeneration.

| CASE III INVENTION | | | |
|---|---|---|---|
| | Stage 1 | Stage 2 | Total |
| Catalyst Circulation | 3134777 | 3134777 lbs/hr | |
| Regenerator Dense Phase Temp. | 1261 | 1311° F. | |
| Regenerator Dilute Phase Temp. | 1256 | 1363° F. | |
| Air Rate | 68.85 | 63.85 MSCFM | |
| | 132.70 | | |
| Regenerator Superficial Vel | 5.0 | 4.8 ft/see | |
| Catalyst Inventory | 89577 | 84038 | 173615 |
| Catalyst Cooler Duty | 0 | 174.1 | 174.1 |
| Flue Gas Comp. | | | |
| CO | 6.46 | 0.04 | |
| CO$_2$ | 12.35 | 17.41 | |
| N$_2$ | 81.19 | 81.39 | |
| O$_2$ | 0.0 | 1.16 | |

The process of the present invention allows a significant reduction in catalyst inventory, and the regeneration will not steam the catalyst nearly as much as the prior art regenerator, because the first stage is conducted at a much lower temperature, and the second stage will be considerably dryer.

The process allows the first stage to operate in partial CO burn mode (with 6.46 moles % CO in the flue gas) while the second stage operates in complete CO burn mode. Such differences in flue gas concentration (first stage highly reducing, second stage oxidizing) would not be tolerable in conventional FCC regenerators in a shared dilute phase. The process of the present invention permits this to happen, making a virtue of the relatively low gas flow rates which plague bubbling dense bed regenerators, and cause laminar gas flow which permits my oriented cyclone inlets to effectively isolate and separate two flue gas streams from a shared dilute phase region.

We claim:

1. A process for the multi-stage, fluidized bed regeneration of coke containing fluidized catalytic cracking catalyst in a regenerator vessel having an upper portion and a lower portion, and containing at least on vertical baffle means within said lower portion adapted to separate said lower portion into at least two isolated fluidized beds beneath a shared dilute phase region, said shared dilute phase region being in said upper portion of said regenerator vessel comprising:

partially regenerating said catalyst by discharging said coke containing catalyst into a primary regeneration stage comprising one of said isolated fluidized beds and having a coked catalyst inlet means, an oxygen containing gas inlet means in a lower portion of said isolated fluidized bed, and operating at catalyst regeneration conditions to produce partially regenerated catalyst which is discharged from said primary regeneration stage via a catalyst transfer means connective with a secondary catalyst regeneration stage, and a primary flue gas stream comprising entrained, partially regenerated catalyst and fines which is discharged up into said shared dilute phase region above said primary regeneration stage;

b) completing regeneration of said catalyst in a secondary regeneration stage comprising at least one other of said isolated fluidized beds and operating at catalyst regeneration conditions and receiving catalyst from said primary stage, and having an oxygen containing gas inlet means in a lower portion of said isolated fluidized bed in said secondary regeneration stage, and a regenerated catalyst outlet means to produce regenerated catalyst which is withdrawn via said regenerated catalyst outlet means and a secondary flue gas stream comprising regenerated catalyst and fines which is discharged up into said shard dilute phase region above said secondary regeneration stage;

c) separating said primary flue gas stream in a primary catalyst and flue gas separation means having an inlet for primary flue gas and entrained partially regenerated catalyst, an outlet for recovered partially regenerated catalyst, and an outlet for flue gas having a reduced catalyst content and adapted to remove said primary flue gas from said regenerator vessel as a primary flue gas stream with a reduced catalyst content, and wherein said inlet of said primary catalyst/flue gas separation means is connective with said shared dilute phase region above said primary regeneration zone; and d) separating said secondary flue gas stream in a secondary flue gas and catalyst separation means having an inlet for secondary flue gas and entrained regenerated catalyst, an outlet for recovered regenerated catalyst, an outlet for secondary flue gas having a reduced catalyst content and adapted to remove said secondary flue gas from said regenerator vessel as a secondary flue gas stream with a reduced catalyst content, and wherein said inlet of said secondary catalyst/flue gas separation means is connective with said shared dilute phase region above said secondary regeneration zone;

e) removing regenerated catalyst from said secondary regeneration stage as a product of said regeneration process; and f) removing from, said regenerator vessel said primary and said secondary flue gas streams as isolated streams.

2. The process of claim 1 wherein said primary regeneration stage is operated at fast fluidized bed catalyst regeneration conditions.

3. The process of claim 1 wherein said secondary regeneration stage is operated at bubbling dense bed catalyst regeneration conditions.

4. The process of claim 1 wherein one of said regeneration stages operates under partial CO burning conditions and the other stage operates under complete CO burning conditions.

5. The process of claim 1 wherein said regenerator vessel is vertical cylindrical vessel having a vertical axis and a diameter, the primary stage of regeneration of catalyst occurs in an interior vertical cylinder having a vertical axis and a diameter less than the diameter of said regenerator vessel, and said interior vertical cylinder is open at the top to the dilute phase region of and axially aligned with said regenerator vessel, and second stage regeneration of catalyst occurs in an annulus between the interior vertical cylinder of the primary stage of regeneration and the regenerator vessel.

6. The process of claim 5 wherein partially regenerated catalyst is transferred from said primary regeneration stage to said secondary regeneration stage by overflow from said vertical cylinder to said annulus.

7. The process of claim 1 wherein the catalyst/flue gas separation means are primary and secondary regeneration stage cyclones having inlet horns and said primary regeneration stage cyclone inlets are located in, or connective with, the dilute phase region directly above said primary regeneration stage and said secondary regeneration stage cyclones have inlet horns located in, or connective with, the dilute phase region directly above said secondary regeneration stage.

8. The process of claim 7 wherein the primary regeneration stage cyclones comprise at least four cyclones, in parallel, having inlet horns directed toward and radially distributed about said central vertical axis; and the secondary regeneration stage cyclones comprise at least four cyclones, in parallel, having inlet horns directed away from and radially distributed about said central vertical axis.

9. The process of claim 1 wherein at least a portion of the regenerated catalyst from the second regeneration stage is recycled to the first regeneration stage by a catalyst recycle means.

10. The process of claim 1 wherein said regenerator vessel is vertical cylindrical vessel having a vertical axis and a diameter, and wherein said relatively dense phase region is divided into at least two side by side regions separated by a horizontal imperforate baffle, and wherein said primary stage of regeneration of catalyst occurs on one side of said baffle plate and said second stage regeneration of catalyst occurs on said other side of said baffle plate.

11. The process of claim 1 wherein partially regenerated catalyst recovered from the flue gas from the primary regeneration stage is discharged into the secondary regeneration stage.

12. The process of claim 1 wherein regenerated catalyst recovered from the flue gas from the secondary stage of regeneration is discharged into the primary regeneration stage.

13. A process for the multi-stage, fluidized bed regeneration of spent, coke containing fluidized catalytic cracking catalyst comprising:

partially regenerating said spent catalyst in a primary regeneration stage by discharging said coked catalyst into a primary regeneration stage within a regenerator vessel, said primary regeneration stage operating at catalyst regeneration conditions and comprising an open topped cylinder disposed in a lower portion of said regenerator vessel and having a coked catalyst inlet, an oxygen containing gas inlet in a lower portion of said open cylinder, and partially regenerating said spent catalyst in said primary regeneration zone by contact with an oxygen containing gas to produce partially regenerated catalyst and a primary flue gas stream comprising gaseous products of combustion and entrained partially regenerated catalyst;

overflowing partially regenerated catalyst from said cylinder into a secondary regeneration zone comprising an annular bed of catalyst around said open cylinder;

discharging said primary flue gas stream up from said open cylinder into a dilute phase region within said regenerator vessel above said open cylinder and above said annular bed;

processing said primary flue gas stream in at least one primary regeneration stage cyclone having an inlet connective with the dilute phase region above said open cylinder and separating same into a primary flue gas stream with a reduced content of partially regenerated catalyst which is withdrawn from said regenerator vessel and a recovered catalyst stream which is returned to a dense phase fluidized bed;

collecting said partially regenerated catalyst from said primary regeneration stage in said annular bed and regenerating same by contact with an oxygen containing regeneration gas at catalyst regeneration conditions to produce regenerated catalyst which is withdrawn as a product from said regenerator vessel and a secondary regeneration stage flue gas comprising entrained regenerated catalyst and gaseous products of combustion; and processing said secondary regeneration stage flue gas stream in at least one secondary regeneration stage cyclone having an inlet connective with the dilute phase region above said annular bed and separating same into a secondary flue gas stream with a reduced content of regenerated catalyst which is withdrawn from said regenerator vessel and a recovered regenerated catalyst stream which is returned to a dense phase fluidized bed.

14. The process of claim 13 wherein said primary regeneration stage is operated at fast fluidized bed catalyst regeneration conditions.

15. The process of claim 13 wherein said secondary regeneration stage is operated at bubbling dense bed catalyst regeneration conditions.

16. The process of claim 13 wherein one of said regeneration stages operates under partial CO burning conditions and the other stage operates under complete CO burning conditions.

* * * * *